July 24, 1951  E. W. MILLER  2,561,706
DIAGONALLY TRAVERSING GEAR FINISHING MACHINE
Filed April 24, 1947  3 Sheets-Sheet 1

INVENTOR.
Edward W. Miller
BY Wright, Brown, Quinby
 & May
 Attys.

July 24, 1951          E. W. MILLER          2,561,706
DIAGONALLY TRAVERSING GEAR FINISHING MACHINE
Filed April 24, 1947          3 Sheets-Sheet 3
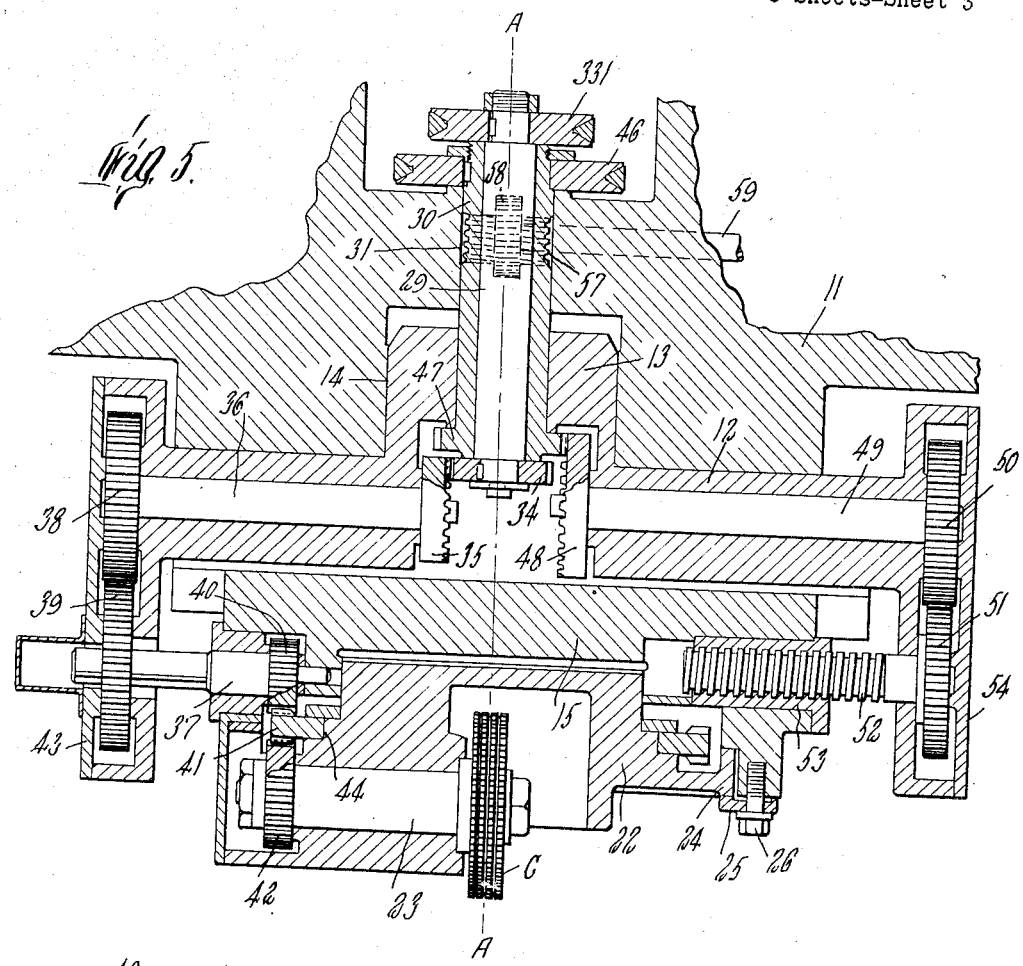
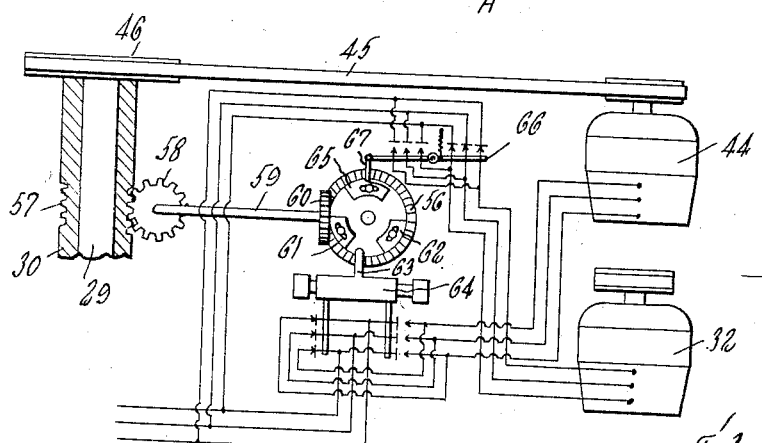

Patented July 24, 1951

2,561,706

UNITED STATES PATENT OFFICE 2,561,706

DIAGONALLY TRAVERSING GEAR FINISHING MACHINE

Edward W. Miller, Springfield, Vt., assignor to The Fellows Gear Shaper Company, Springfield, Vt., a corporation of Vermont Application April 24, 1947, Serial No. 743,679

4 Claims. (Cl. 90—1.6)

The present invention relates to machines for finishing gears by shaving material from the side faces of their teeth, or otherwise modifying such faces. In the shaving operation a tool is used which is in the form of a gear conjugate to the gears to be finished, but is made of material suitable for metal cutting tools and is provided with lateral cutting edges and intermediate lands in the side faces between the ends of its teeth. The tool and work gear are rotated in mesh together, one of them being positively driven and transmitting rotation of the other by gear action, and at the same time a reciprocating traverse is imparted to one of them. In the practice heretofore such reciprocating traverse has generally been carried out in a path parallel to the axis of the gear, or coincident with that axis when the work gear has been reciprocated past the shaving tool.

The object of the present invention is to provide a means whereby the reciprocating movement can be effected in a path which is not parallel to or coincident with the axis of the work gear, and in connection therewith to provide adjusting means whereby the path can be located at any inclination between parallelism and a predetermined maximum angle to such axis. A related object is to provide a simple and efficient means whereby reciprocating movement can be imparted to the reciprocable member in any such path and rotation imparted at the same time to the rotatable member. A further object is to combine with the foregoing, provisions for relatively adjusting the tool holder and the work holder so that the axes of the tool and work piece may be inclined to one another in accordance with helix angles of the teeth of either or both the tool and work piece and the path of reciprocation may be inclined to both axes.

The invention comprises practical embodiments of means for accomplishing the foregoing objects. One embodiment is shown in the drawings furnished herewith and described in the following specification; but all equivalent embodiments are embraced within the scope of the protection herein claimed.

The term "diagonal" used in the title of this specification may be defined as signifying the capacity afforded by the present invention of causing the reciprocating member, whether it be the tool or the work gear, to reciprocate in a path which is inclined to both the axis of the tool and the axis of the work piece, that is, diagonal to both axes.

In the following specification the applicability of the invention to finishing gears by shaving will be described, but without intent or implication of excluding other types of finishing or the use of other tools than a shaving cutter.

In the accompanying drawings—

Fig. 5 is a horizontal section on line 5—5 of Fig. 3;

Fig. 6 is a diagram of control means for causing reversals of the motors by which the moving parts of the machine are driven.

Like reference characters designate the same parts wherever they occur in all the figures.

Figure 1:
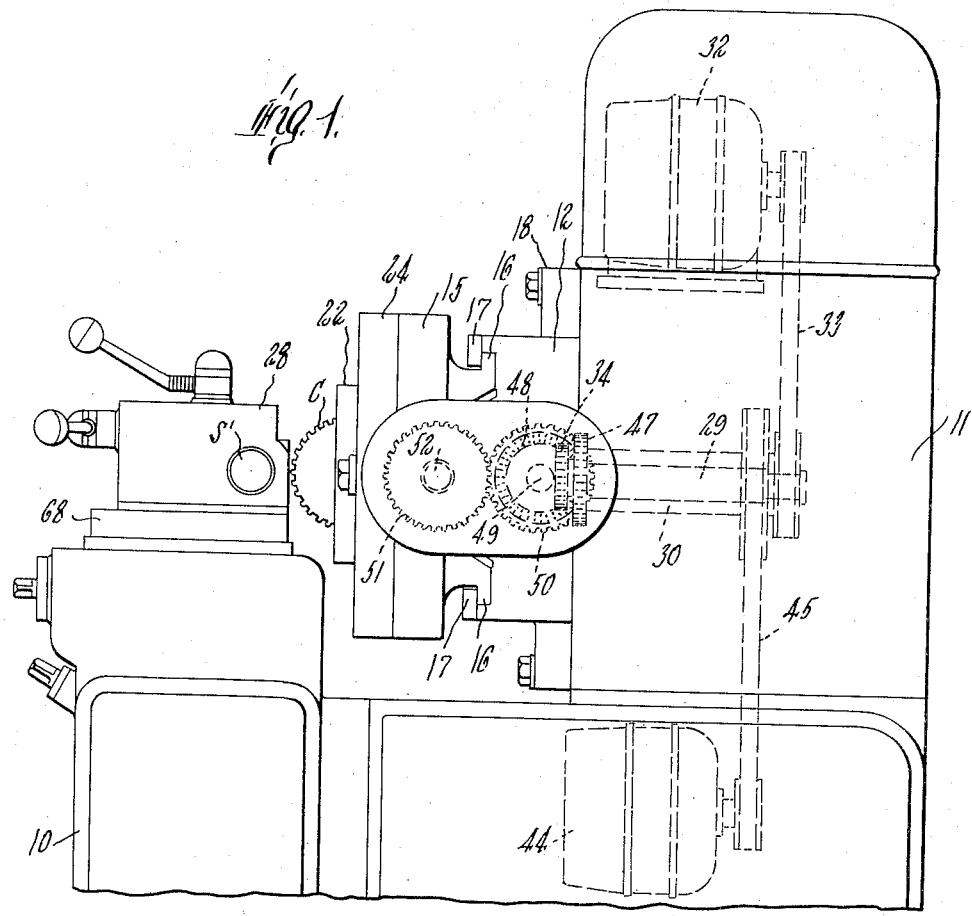
Fig. 1 is a side elevation of a gear shaving machine in which the invention is embodied.
Figure 2:
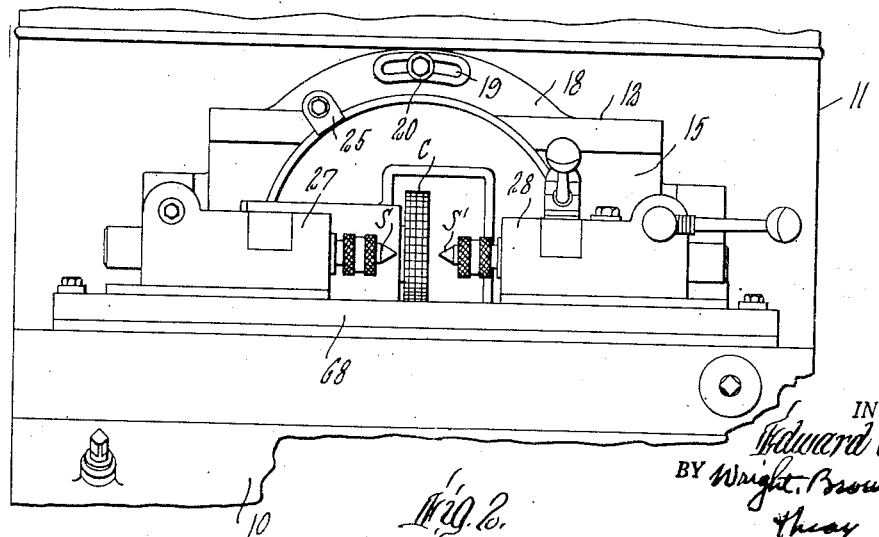
Fig. 2 is a front elevation of the work and tool holding parts of the machine.
Figure 3:
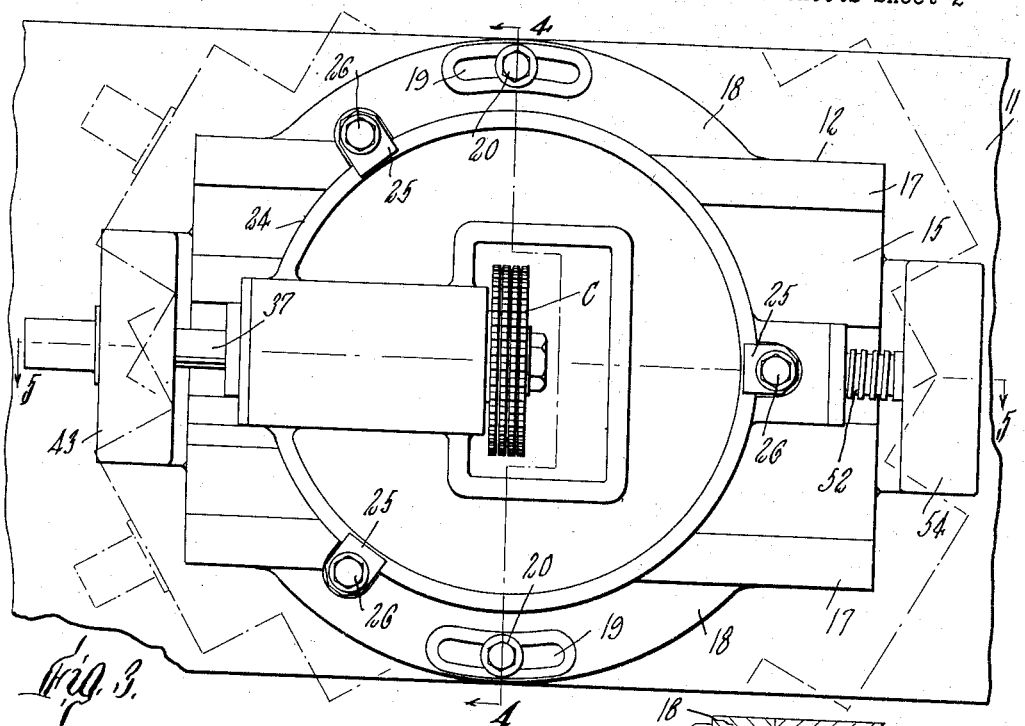
Fig. 3 is a front elevation on a larger scale of the tool holding head or turret, the slide or carriage on which the tool head is mounted, and the angularly adjustable support for the carriage.
Figure 4:
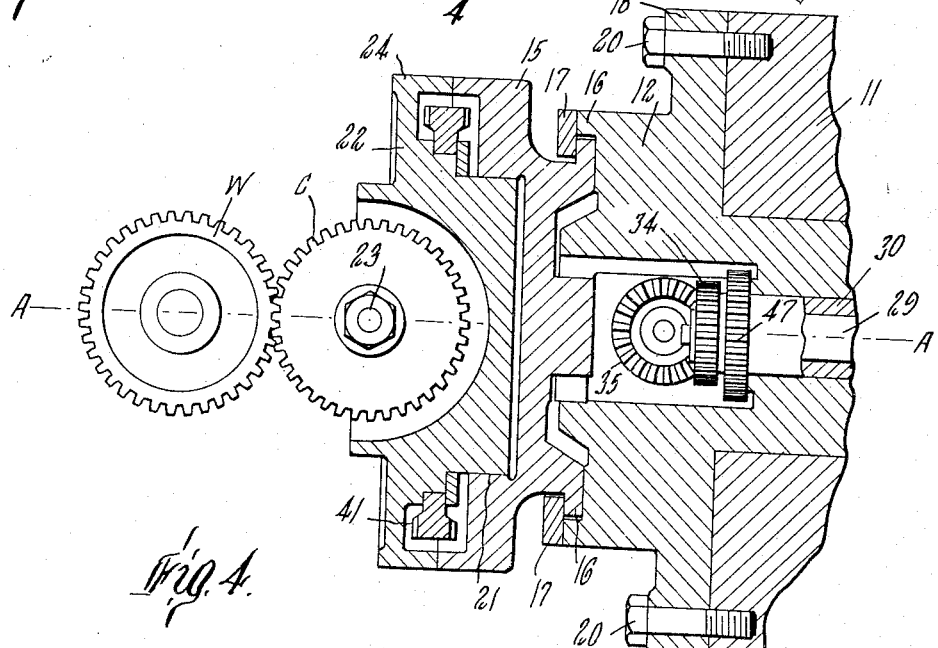
Fig. 4 is a vertical section on line 4—4 of Fig. 3.

A frame structure of any suitable character, here shown as a base 10 and a column 11 rising therefrom, supports the shaving tool, or cutter C, and centers S and S' on which work gears may be supported rotatably. The shaving tool is of gear formation having grooves in the sides of its teeth, the intersections of which with the tooth faces form cutting edges and the tooth faces between the grooves form lands by which penetration of the edges into the surfaces of the work gear teeth is limited. The tool is rotatable about its axis and is angularly adjustable about an axis intersecting and perpendicular to its own axis, and is reciprocable in a path perpendicular to the second named axis which can be adjusted between the horizontal and various angles of inclination. The construction and means by which such movements and adjustments are made possible and accomplished, in the present embodiment of the invention, are the following:

A carriage guide 12 having a cylindrical hub 13 is mounted on the column 11 with its hub fitted rotatably in a bearing 14 in the column, as shown by Fig. 5. The axis of the bearing is there indicated by the dot and dash line A—A. A slide or carriage 15 is mounted to reciprocate on the guide, having lips 16 fitted to parallel ways in the guide in which they are confined by gibs 17. The guideway, and consequently the path to which the movements of the carriage are confined, is perpendicular to the axis A—A. This guide, and with it the carriage 15, is adjustable angularly around the axis A—A, having lateral flanges 18 bearing against the front face of the column, in which flanges coaxial arcuate slots 19 are cut. Clamp bolts 20 pass through these slots into tapped holes in the column. A series of such holes are provided in the column equidistant from axis A—A and spaced apart from one another by distances slightly less than the length of the slots, whereby it is made possible to adjust the guide in either direction from the central or horizontal position shown in these drawings, through a wide angle, and secure the adjustment at any inclination within such limits as are imposed by the machine base. Two of the possible adjustments are indicated by broken lines in Fig. 3.

The carriage 15 contains a cylindrical bearing 21, coaxial with the axis A—A, when the carriage is at one point in its path (and parallel when the carriage is in other locations), in which is rotatably fitted the hub portion of a tool head or turret 22. A shaft 23 is mounted rotatably in the turret 22 with its axis intersecting the axis of bearing 21 at right angles. The cutter is mounted on shaft 23 preferably in a position such that it is crossed at mid length by the axis of the bearing. Shaft 23 may be considered as the cutter spindle of the machine. A circular flange 24 on the turret bears against a circular flange on the carriage 15, the contacting faces of these flanges being in a plane perpendicular to axis A—A, and clamps 25 mounted on the carriage by bolts 26 overlap the flange 24, securing the turret in various positions of angular adjustment. Preferably the arrangement of the clamps is such that the turret 22 may be set so that the axis of the spindle 23 is parallel to the guiding elements of guide 12 or at any angle within a wide range to either side of the parallel position.

The centers S and S' are mounted in a head stock 27 and a tail stock 28 on a forward part of the machine base 10 so that their axis intersects the axis A—A and is perpendicular thereto. With reference to the machine embodiment here illustrated, the axis of the centers S, S' is horizontal and is parallel to the axis of the cutter spindle and to the guideways of carriage 15 when both the cutter head or turret and the carriage guide are in their mid position of adjustment. By angularly adjusting the guideway 12, the path of reciprocation of the cutter carriage can be set at various inclinations, hence out of parallelism in various degrees with the axis of the work holding centers; and by angular adjustment of the turret 22, the axis of the cutter C can be placed askew to the axis of the work at various suitable angles when the guide is inclined. As is common in this art, a cutter having spur teeth can be meshed with a work gear having helical teeth, or a cutter with helical teeth can be meshed with a spur gear or a helical work gear having teeth of a different helix angle than that of the cutter teeth, to effect endwise slip or skid of the cutter teeth and work gear teeth as they rotate about their respective nonparallel axes.

The head stock 27 and tail stock 28 are adjustable to various positions along their common axial line, and to different distances apart, in order to accommodate work gears of different axial lengths and to locate any desired point in the length dimension of a work gear at the axis A—A. The column 11 is adjustable in the forward and rearward direction to accommodate the cutter to work gears of different diameters, in known manner.

In this machine the cutter is driven positively and imparts rotation to the work gear through their intermeshing teeth. For thus driving the cutter, a shaft 29 is mounted rotatably in a tubular shaft 30 which occupies rotatably a bearing 31 in the column 11. The axes of both these shafts coincide with the axis A—A. Driving means, here typified by an electric motor 32 in the top of column 11, transmits rotation to shaft 29 by a belt 33 and pulley 331. A pinion 34 on shaft 29 meshes with a face gear 35 on a shaft 36 which is perpendicular to axis A—A and parallel to the guide 12. Shaft 36 drives a parallel shaft 37 through change gears 38, 39, and shaft 37 drives the cutter spindle 23 by means of a gear 40 meshing with teeth on one face of a double face gear 41, and a pinion 42 which is keyed to spindle 23 and meshes with teeth on the opposite face of gear 41.

It may be noted that shaft 37 has its bearing in the carriage 15 and has a splined engagement with gear 39, which is supported by a housing 43 on the carriage guide 12. The double face gear is centered on axis A—A and fitted to a bearing 44 on turret 22.

The tubular shaft 30 is driven by motive means here illustratively indicated as an electric motor 44 in the base, transmitting rotation by a belt 45 to a pulley 46 on the outer end of the shaft. A pinion 47 on the inner end of shaft 30 meshes with a face gear 48 on a shaft 49 which is mounted in the carriage guide 12 and preferably is parallel with the guiding elements thereof. Shaft 49 drives, through change gears 50 and 51, a screw 52 which extends parallel to the guide 12 and meshes with a nut 53 secured to the carriage 15. The screw and its associated gear are mounted in a housing 54 which forms part of the structure of guide 12.

The motor 44 is reversible to propel the carriage alternately back and forth, and the tool driving motor 32 may also be reversible simultaneously with reversals of motor 44 or at other intervals, although not necessarily, for it is possible to drive the tool continuously in the same direction while the carriage travels in opposite directions. Any one of a variety of timing means may be employed for causing such reversals and regulating the length of the reciprocating travel. One such means is shown diagrammatically in Fig. 6. Here a disk or drum 56 is rotated by a worm 57 on the shaft 30, a worm wheel 58 meshing with the worm, and a shaft 59 to which the worm wheel 58 is secured and on which is mounted a gear 60 meshing with gear teeth on the timing drum 56. The latter carries two dogs 61 and 62 spaced apart and adjustable to vary the width of the space between them, between which is located a projection 63 on a reciprocable switch shifter 64 which operates reversing switches of known character in the circuit of motor 44. The lost motion between the dogs 61 and 62 and the projection 63, controlled by adjustment of the dogs, determines the length of stroke and times of reversal of the carriage 15. When it is desirable to cause reversals of the tool driving motor 32 independently of the carriage driving motor 44, a separate adjustable device such as a cam 65 may be mounted on the timing drum to actuate a reversing switch shifter 66 by means of a follower 67, shifter 66 being organized to operate a reversing switch of known character in the circuit of motor 32. Alternatively, however, the lead conductors of motor 32 may be interconnected with those of the motor 44 so that both motors may be controlled by the same switches.

It is within my contemplation, however, to drive both shafts 29 and 30 by a single motor instead of two motors as shown; the single motor then being provided with two delivery pulleys in driving connection with the shaft pulleys 33I and 46, respectively.

It will be obvious from the foregoing description that the finishing tool may be set at a skew angle to the work gear equal or complementary to the difference of helix angle between the teeth of the tool and gear when either is a helical gear and the other a spur gear, or both are helical gears differing from one another in helix angle. Equally obvious is the fact that the guide for the tool carriage can be set so that, with any crossed axis relationship of the cutter and work gear, the path in which the tool is traversed is diagonal to both axes of tool and work.

Various departures from the machine design here shown can be made within the scope of the invention. Thus, for instance, it is not essential that the work holding means be disposed to support work gears on a horizontal axis. These means can be otherwise disposed and the guide for the carriage and tool holding turret disposed correspondingly to obtain the effects of adjustment and directions of reciprocation equivalent to those previously described. Crowning of the work gear if desired may be effected by imparting a swinging movement to the table 68 on which the head stock 27 and tail stock 28 are mounted, while the tool is traversed along the work. Means suitable to impart such a swinging movement are shown in my prior Patents 2,362,763 and 2,362,764, and the patent to Ward et al. 2,362,785, any of which can be applied to the machine embodiment here shown.

It is not essential that the work gear be mounted on the centers S, S' and the shaving tool on the shaft 23. The locations of tool and work can be reversed with attainment of like results.

It may be understood further that this machine and equivalent machines containing the principles of the invention may be used to perform other finishing actions on gears than shaving; for instance, lapping or burnishing. For the performance of such other finishing actions, a gear shaped lapping tool or a gear shaped burnishing tool is substituted for the shaving tool shown. In any case the tool is essentially a gear element in that it has teeth of gear tooth form conjugate to the gears on which it is designed to operate.

I claim:

1. In a machine of the character set forth, a supporting structure, a guide member mounted on the supporting structure with provision for angular adjustment and having a guideway transverse to the axis about which it is angularly adjustable, a carriage mounted and reciprocable in the guideway of said guide member, a turret mounted on said carriage with provision for angular adjustment about an axis substantially coincident or parallel with the before named axis, a spindle rotatably mounted in said turret with its axis transverse to the before named axes, two shafts coaxial with the axis of adjustment of the guide, driving torque transmitting means engaged with one end of each shaft, gearing between the opposite end of one of said shafts and the spindle for transmitting rotation to the spindle, and gearing between the opposite end of the other shaft from the torque transmitting means of that shaft and the carriage for transmitting rectilinear movement to the carriage.

2. In a machine of the character set forth, a supporting structure, a guide member mounted on said supporting structure with provision for angular adjustment and having carriage guiding means transverse to the axis around which it is adjustable, coaxial shafts, one of which is tubular and surrounds the other, arranged coaxial with the axis of angular adjustment of the guide, means for imparting rotation to said shafts, a carriage engaged with said guiding means for reciprocating movement, a shaft on the guideway geared to one of said coaxial shafts, an element organized to impart rectilinear movement to the carriage in geared connection with the last named shaft, a spindle mounted rotatably on the carriage, a second shaft mounted on the guide member in geared connection with the other of said coaxial shafts, and transmission gearing arranged to transmit rotation from the last named shaft to said spindle.

3. A machine for finishing gears by meshing rotation and relative translative displacement between a work gear and a gear shaped finishing tool, comprising a supporting structure, a guide member mounted on said supporting structure with provision for angular adjustment and having a guideway perpendicular to the axis of such adjustment, a carriage supported by said guide member for linear movement in said guideway, a turret supported on said carriage for angular adjusting movement about an axis parallel to or coincident with the before named axis, a spindle adapted to carry a finishing tool or a work gear mounted in said turret to rotate about an axis perpendicular to the precedently named axes, a tubular shaft and an inner shaft rotatably contained therein, both shafts being coaxial with the axis of angular movement of the guide member, two shafts radially mounted in said guide member, one of which is in geared connection with said tubular shaft and the other is in geared connection with the other of said coaxial shafts, gearing between one of said radial shafts and said spindle arranged to transmit rotation from the shaft to the spindle, a screw held by said guide member in threaded engagement with said carriage, and gearing between the other radial shaft and said screw for driving the latter to impart linear movement to the carriage.

4. A gear finishing machine comprising a supporting structure, means for supporting a work gear, a guide, said means and guide being both mounted on the supporting structure, a carriage mounted for reciprocating movement on said guide, a finishing tool holder mounted on said carriage, and means for reciprocating said carriage and rotating said tool holder; the tool holder being angularly adjustable on the supporting structure about an axis transverse to the rotational axis of the tool whereby to place the plane of rotation of the tool at an inclination to the plane of rotation of a work gear mounted on the work holder, said guide being angularly adjustable to place the path of reciprocation of the carriage at an inclination to both the axis of the tool and the axis of the work, and the means for rotating the work holder and reciprocating the carriage including two shafts coaxial with the axis of angular adjustment of the guide extending from an outer part of the supporting structure to the guide, and motive means coupled with the outer ends of said shafts to impart rotation thereto.

EDWARD W. MILLER.

REFERENCES CITED

The following references are of record in the file of this patent:

UNITED STATES PATENTS

| Number | Name | Date |
|---|---|---|
| 1,443,899 | Kusold | Jan. 30, 1923 |
| 2,280,045 | Miller | Apr. 14, 1942 |
| 2,289,912 | Hirsch | July 14, 1942 |
| 2,362,762 | Miller | Nov. 14, 1944 |

FOREIGN PATENTS

| Number | Country | Date |
|---|---|---|
| 480,247 | Great Britain | Feb. 14, 1938 |